UNITED STATES PATENT OFFICE.

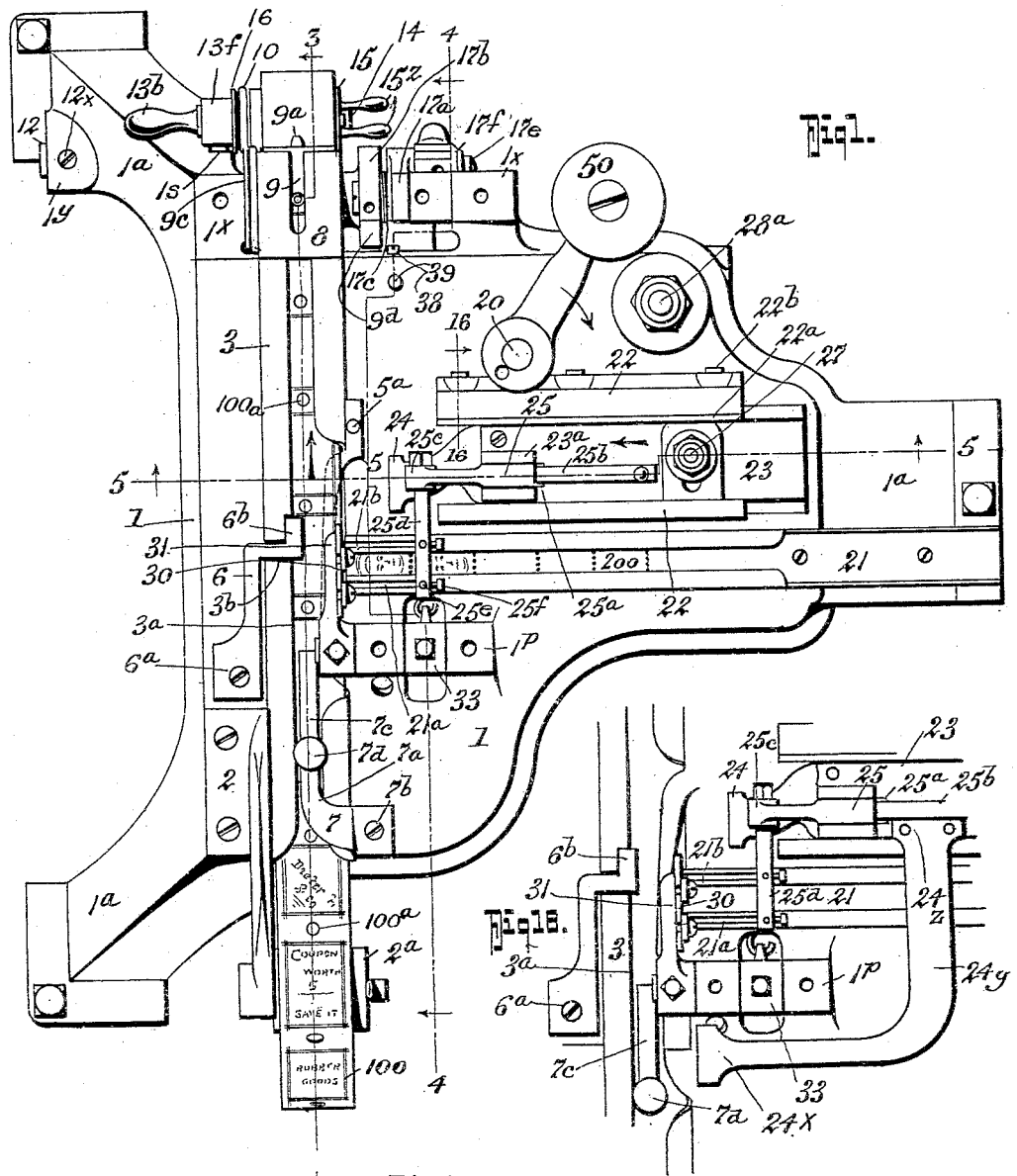

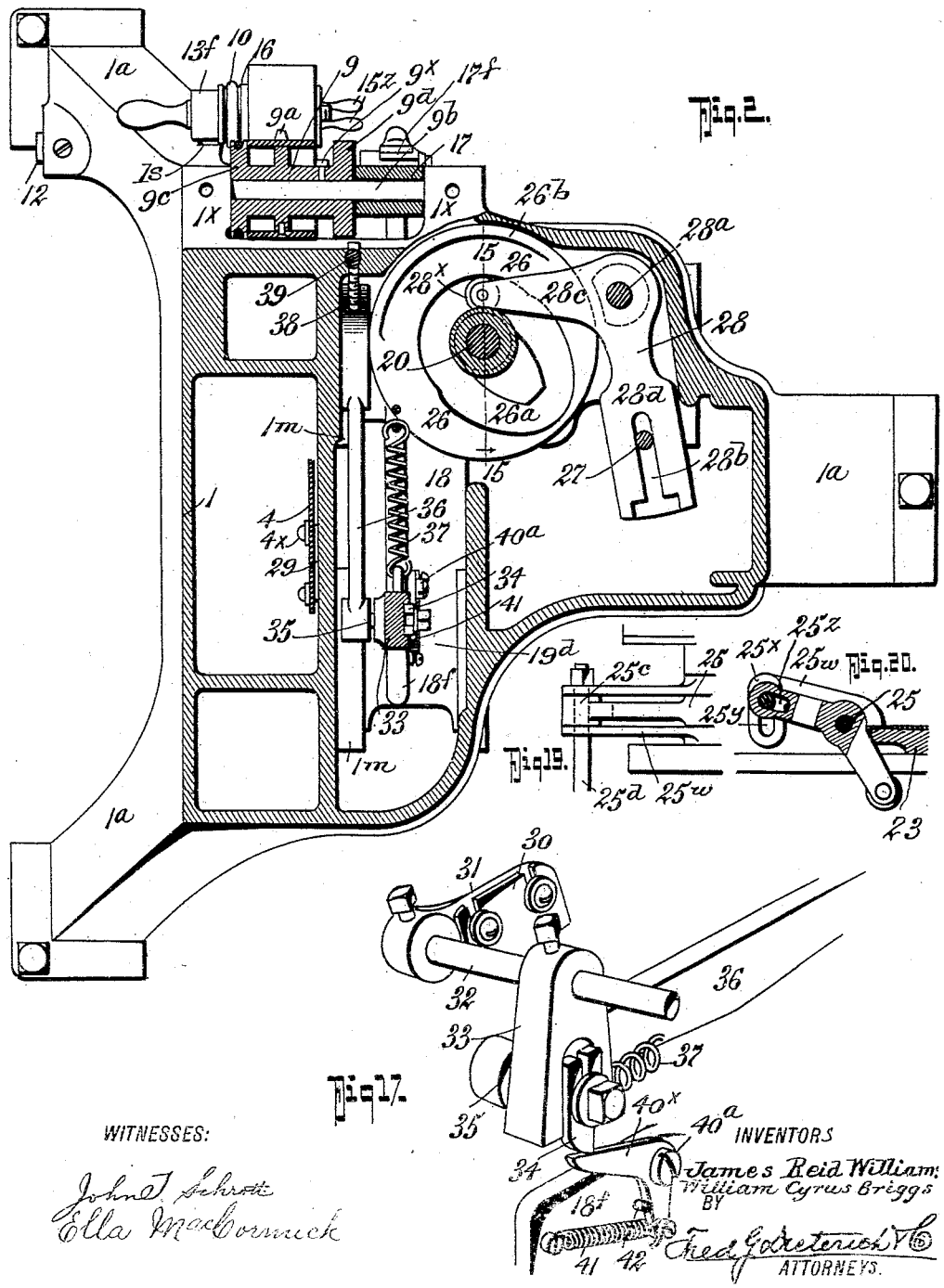

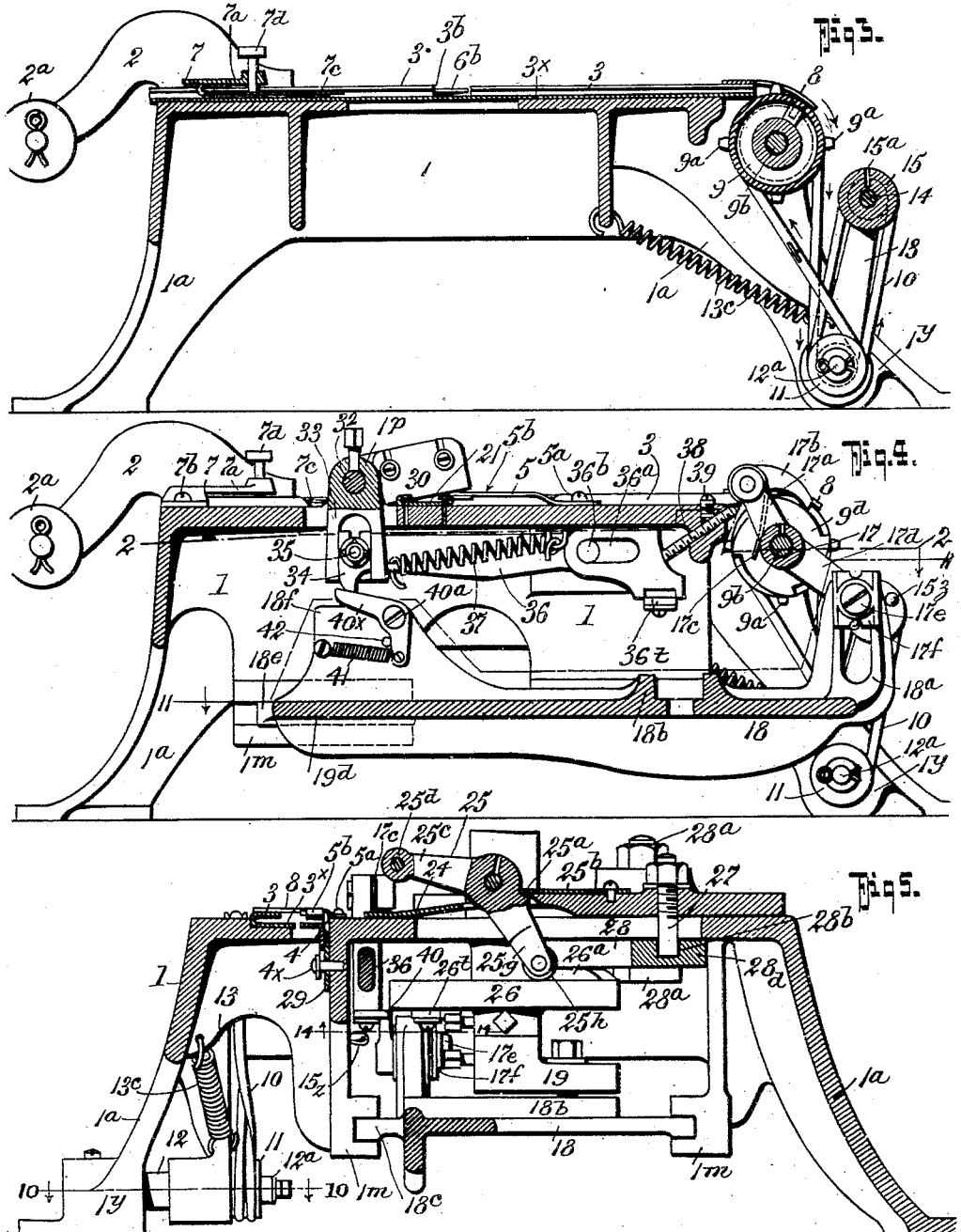

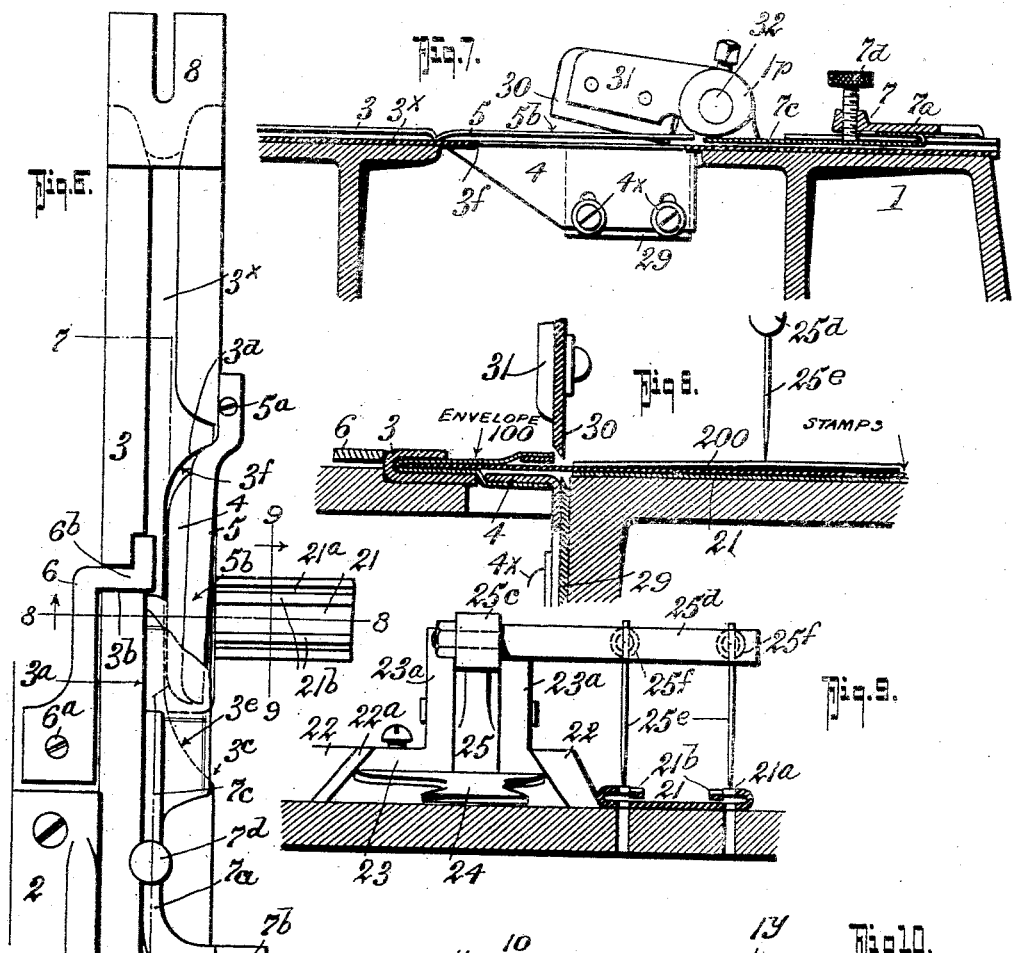

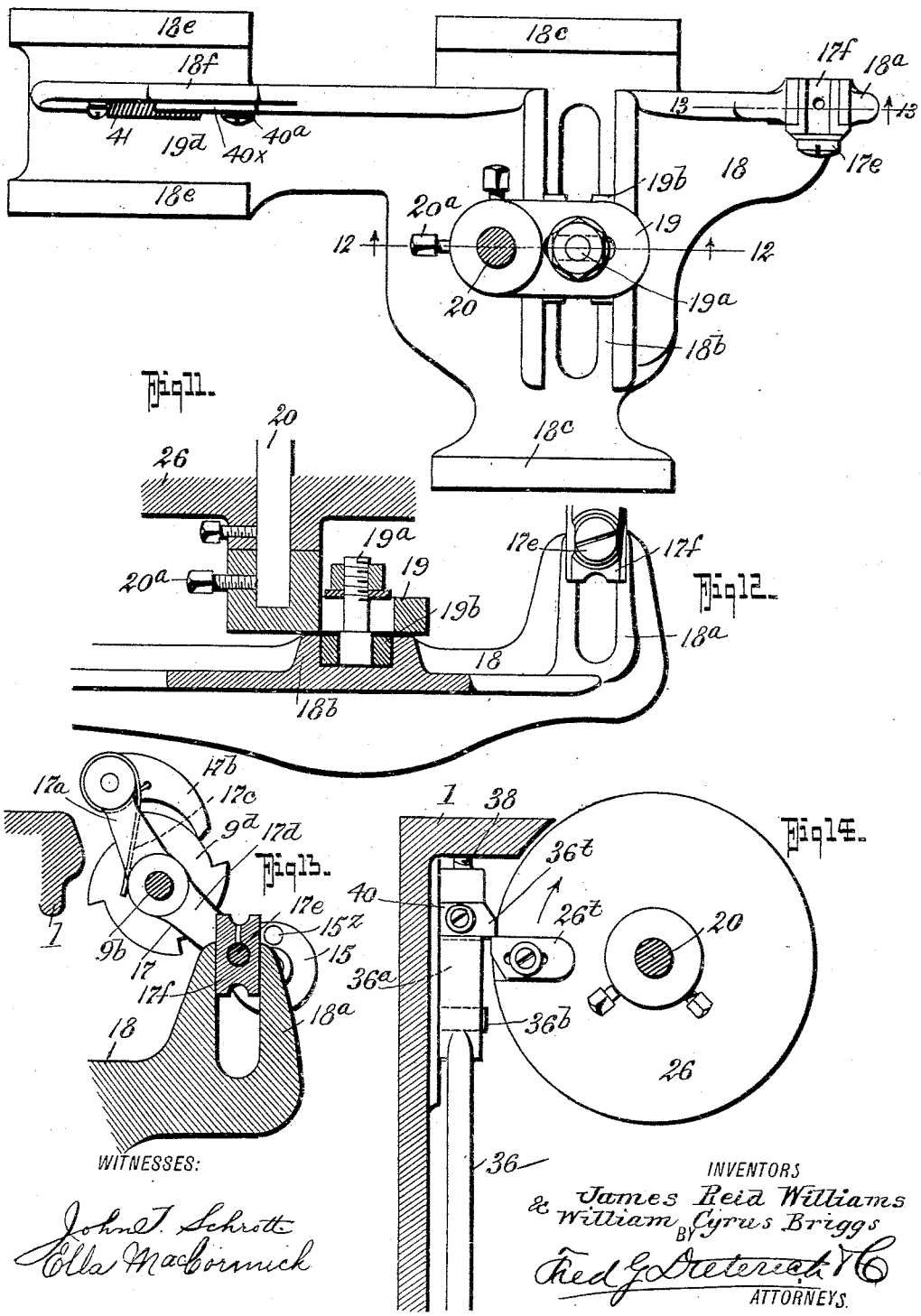

JAMES REID WILLIAMS, OF WILMINGTON, AND WILLIAM CYRUS BRIGGS, OF WINSTON SALEM, NORTH CAROLINA, ASSIGNORS TO THE NATIONAL STAMP VENDING MACHINE COMPANY, INCORPORATED, OF WILMINGTON, NORTH CAROLINA.

ENVELOP-LOADING MACHINE.

964,077.　　　　Specification of Letters Patent.　　Patented July 12, 1910.

Application filed August 20, 1908. Serial No. 449,486.

*To all whom it may concern:*

Be it known that we, JAMES REID WILLIAMS and WILLIAM C. BRIGGS, residing at Wilmington and Winston Salem, respectively, and in the counties of New Hanover and Forsyth, respectively, and State of North Carolina, have invented certain new and useful Improvements in Envelop-Loading Machines, of which the following is a specification.

Our invention relates to a machine for automatically loading vendible articles in continuous envelops, particularly of the type disclosed in the Patent 895,527 granted August 11, 1908.

The sales strip which is adapted to be loaded by this apparatus is shown particularly in Figures 1 and 21 of the drawings, hereinafter referred to, and is formed of a strip folded over upon itself and provided with perforations at suitable intervals as shown in the patent hereinbefore referred to.

More specifically, our invention has for its object to provide a machine for loading postage stamps into continuous envelops, and in its generic nature the invention comprises a means for moving the envelop step by step past a delivering mechanism, means for moving the vendible article through the delivering mechanism into the envelop, the vendible article being in a strip form, and separating the strip into sections as each section is fed into the envelop.

Our invention also includes means for automatically opening the envelop as it arrives at the feeding mechanism and then automatically closing the envelop as it passes the feeding mechanism, and means for keeping the envelop under proper tension.

Our invention embodies in a modified form means for clearing the envelop pockets of obstructions before the feeding mechanism feeds the vendible article into the envelop pocket.

In its more detail nature, our invention embodies those novel details of construction, combination and arrangement of parts, all of which will be first described in detail and then be specifically pointed out in the appended claims, reference being had to the accompanying drawings, in which:—

Fig. 1, is a top plan view of our machine. Fig. 2, is a horizontal section on the line 2—2 of Fig. 4. Fig. 3, is a vertical section on the line 3—3 of Fig. 1. Fig. 4, is a vertical section on the line 4—4 of Fig. 1. Fig. 5, is a vertical section on the line 5—5 of Fig. 1. Fig. 6, is a detail view of the continuous envelop guide and opening and closing mechanism. Fig. 7, is a detail section on the line 7—7 of Fig. 6. Fig. 8, is a detail section on the line 8—8 of Fig. 6. Fig. 9, is a detail section on the line 9—9 of Fig. 6. Fig. 10, is a detail section on the line 10—10 of Fig. 5. Fig. 11, is a detail horizontal section on the line 11—11 of Fig. 4. Fig. 12, is a detail section on the line 12—12 of Fig. 11. Fig. 13, is a detail section on the line 13—13 of Fig. 11. Fig. 14, is a detail section on the line 14—14 of Fig. 5. Fig. 15, is a detail section on the line 15—15 of Fig. 2. Fig. 16, is a detail section on the line 16—16 of Fig. 1. Fig. 17, is a detail perspective view of parts of the cutting mechanism. Fig. 18, is a detail plan view showing a modified form of our invention. Figs. 19 and 20, are detail views of further modifications. Fig. 21, is a detail perspective view of the envelop parting means.

This machine in its make-up embodies essentially the following parts, first, a strip feeding mechanism; secondly, a vendible article feeding mechanism; thirdly, a cutting mechanism for severing the vendible articles from a continuous strip, and fourthly, a means for forcing the severed article fully into the continuous strip or envelop.

In order to fully describe the construction and operation of our invention, we will describe the several parts in the order just mentioned.

*Envelop strip feeding mechanism.*—By referring now to the drawings, in which like letters and numerals of reference indicate like parts in all of the figures, it will be seen that 1 designates the main casting or frame which includes the legs 1ª. Secured to the casting 1 is a bracket 2 that carries an idler pulley 2ª on which the reel of continuous envelops 100 is primarily placed.

3 designates the strip guide which guides the envelop from the reel past the loading mechanism and winds it up in a reel-form on a drum 15, hereinafter again referred to, after the envelop has been loaded. The guide 3 preferably consists of a sheet metal body of flat tubular form in cross section, and having a longitudinal opening 3ᵃ in its upper surface with which a transverse opening 3ᵇ merges at one side and a larger opening 3ᶜ on the other side. Below the opening 3ᶜ in the upper surface of the guide 3 the lower surface 3ˣ is cut away as at 3ᵈ, the cut-away portions having curved terminations 3ᵉ—3ᶠ for a purpose which will hereinafter appear.

4 and 5 represent the envelop openers, the opener 4 lying in the same plane as the bottom 3ˣ of the envelop guide 3 and being secured by screws 4ˣ to a part of the main frame 1, while the upper opener 5 is secured at one end as at 5ᵃ to the main frame or casting leaving a resilient knife-like portion 5ᵇ lying in a plane above that of the opener 4 and substantially in the same plane with the top of the guide 3.

6 designates a presser which is secured at 6ᵃ to the casting 1, and is bent as at 6ᵇ to enter the cut-away portion 3ᵇ of the guide 3 and press upon the envelop, the presser 6 being resilient to permit the proper "give" as the vendible article is inserted into the envelop pocket.

7 designates a tension device which comprises a bracket 7ᵃ secured at 7ᵇ to the casting 1 and provided with a resilient arm 7ᶜ whose tension is controlled by a set screw 7ᵈ so that proper pressure may be applied to the envelop 100, as it passes through the guide 3 for a purpose presently more fully explained.

The guide 3, at its outlet end, terminates in a guard 8, which projects over a feed drum 9 which has spikes or pins 9ᵃ to project through apertures 100ᵃ in the envelop 100 and draw the envelop through the guide 3 from its reel. The free end of the envelop strip is inserted into a slot 15ᵃ on the "wind-up-drum" 15 that is mounted on a shaft 14 and driven through the medium of an endless belt 10 that passes around a pulley 16 on the shaft 14, the shaft 14 being mounted in a bearing 13ᶠ in an arm 13, hereinafter again referred to. The feed drum 9 is mounted on a shaft 9ᵇ and secured thereto by a set screw 9ˣ, the shaft 9ᵇ being mounted in bearings 1ˣ of the main frame or casting 1 and the drum 9 also is formed with a grooved pulley 9ᶜ over which the endless belt 10 passes, and with a ratchet disk 9ᵈ to coöperate with an operating pawl 17ᵇ, hereinafter again referred to.

12 designates a shaft mounted in a bearing 1ʸ of the casting 1 and secured from rotation by a set screw 12ˣ. The shaft 12 carries an eccentric stub shaft 12ᵃ on which a double grooved pulley 11 is mounted, and around which the endless belt 10 passes. By rotating the shaft 12 in its bearing 1ᵒ and holding it by the set screw 12ˣ the tension of the belt 10 may be adjusted at will to loosen or tighten the same.

On the shaft 12 is an arm 13 that carries the shaft 14, hereinbefore referred to, and the arm 13 is held with the "wind-up" pulley 15 adjacent to the feed drum 9 by a spring 13ᶜ that is secured to the arm 13 and to a fixed part of the main frame 1, the movement of the arm 13 under the influence of the spring 13ᶜ being limited by a stop 1ˢ on the main frame or casting 1.

The arm 17, which is mounted on the drum shaft 9ᵇ, has a short lever portion 17ᵃ to which the pawl 17ᵇ is pivoted, and spring pressed into engagement with the ratchet disk 9ᵈ, by a spring 17ᶜ, more clearly shown in Fig. 4, of the drawings, and the arm 17 is also provided with a longer lever portion 17ᵈ to the end of which a bearing block 17ᶠ is secured on a stub shaft or bolt 17ᵉ, the block 17ᶠ being vertically slidable on a forked bearing 18ᵃ formed with a sliding frame 18 that is reciprocated in a horizontal plane. The sliding frame 18 has slide bearings 18ᶜ to slide in bracket guides 1ᵐ of the main frame or casting 1 and it is also provided with a transverse bearing slide 18ᵇ in which the sliding bearing block 19ᵇ, that is pivoted on a stud bolt 19ᵃ, operates, the bolt 19ᵃ being carried by a crank 19 that is secured to the lower end of the drive shaft 20 by a set screw 20ᵃ as shown in Figs. 11 and 12 of the drawings.

The foregoing mechanism with the exception of the parts 4 and 5 constitute the envelop feeding mechanism and the parts 4 and 5 constitute the envelop opening mechanism.

*Article feeding mechanism.*—The vendible article feeding mechanism comprises a chute 21 in which the vendible article strip is inserted, the chute 21 being secured to the main frame 1 to lie in a plane with the envelop guide 3. At its delivery end the chute 21 is slotted as at 21ᵃ to provide resilient fingers 21ᵇ that press down upon the vendible article 200. The slots 21ᵃ also serve as passage-ways for the feeding needles, hereinafter again referred to.

Mounted to slide in bearings 22 on the frame 1 is a carriage 23. One or both of the bearings 22 may be provided with a wear-piece 22ᵃ which, as the bearing surfaces wear, may be tightened up by set screws 23ᵇ, as shown in Fig. 1, of the drawings. The carriage 23 has bearing lugs 23ᵃ in which a rocking member 25 is pivoted, the rocking member 25 having an arm 25ᶜ that carries a rod 25ᵈ that projects over the chute 21 and is apertured to receive the gripping needles 25ᵉ, the needles 25ᵉ being held in position by set screws 25ᶠ. The rocking member 25 is also provided with a heel 25ᵃ against which a leaf spring 25ᵇ presses to normally hold the arm 25ᶜ elevated with the needles 25ᵉ out of engagement with the article strip. The rocking member 25 is also provided with an operating lever portion 25ᵍ that carries a friction roller 25ʰ that engages the cam disk 26 whose peripheral cam surface 26ᵇ is adapted to rock the rocking member 25 to bring its needles 25ᵉ into and out of engagement with the vendible article strip.

To the front of the carriage 23 a pusher 24 is secured, the pusher 24 forming the means for projecting the severed article sections fully into the continuous envelop pocket.

The cam disk 26 is provided with a cam groove 26ᵃ to form a camway in which an anti-friction roller 28ˣ that is carried by one arm 28ᶜ of a bell crank lever 28, operates. The bell crank lever 28 is pivoted at 28ᶻ. The other arm 28ᵈ of the bell crank lever 28 is slotted as at 28ᵇ to receive the pin 27 that projects from the carriage 23 and through the medium of which the carriage 23 is operated. The foregoing constitute the article feeding mechanism.

*Strip cutting mechanism.*—The strip cutting mechanism comprises a fixed knife 29 that is secured by the screws 4ˣ between the opener 4 and the frame or casting 1. The fixed knife 29 coöperates with a movable knife 30 that is secured to the arm 31 that is in turn fastened to a shaft 32 which is mounted in bearings 1ᵖ of the frame 1, the rock shaft 32 having an arm 33 secured thereto to project through an aperture in the casting 1. The arm 33 carries an adjustable trip 34 most clearly shown in Fig. 4, of the drawings and is pivoted at 35 to a reciprocating rod 36 having an elongated aperture 36ᵃ through which a screw 36ᵇ passes into the frame 1 to limit the reciprocatory movement of the rod 36, the rod 36 being moved in one direction, under the influence of a coil spring 37 to hold the movable knife 31 out of engagement with the fixed knife 29, as clearly shown in Fig. 4 of the drawings.

38 designates an adjusting screw which is locked by a set screw 39 and through the medium of which the throw of the movable knife 31 may be adjusted by limiting the movement of the rod or arm 36 in one direction.

The arm 36 carries a trip 40 which is adapted to be engaged by an adjustable trip 26ᵗ carried by the under surface of the cam disk 26 so as to effect a positive return of the knife 30 to its "open" or elevated position.

The frame 18 has an extension 19ᵈ provided with slide bearings 18ᵉ to coöperate with the bracket bearings 1ᵐ of the frame 1 and the extension 19ᵈ has a web 18ᶠ to which a pawl 40ˣ is pivoted, as at 40ᵃ, the pawl 40 being spring pressed in one direction by a spring 41 and its movement in such direction being limited by a stub pin 42 on the web 18ᶠ. Thus as the frame 18 is oscillated, the pawl 40ˣ will engage the trip 34 and cause the movable knife 30 to effect a shearing action in conjunction with the fixed knife 29 and cut off a section of the vendible article. The sales strip 100 has perforations 100ᵃ at suitable intervals.

*Operation.*—In operation, the sales strip is fed into the guide 3, from the reel with the openers 4 and 5 projected into the strip in a manner indicated in Fig. 8 of the drawings, so as to open the sales strip as it passes across the delivery end of the chute 21 the sales strip being threaded through the guide 3. The strip has its end inserted into the slit 15ᵃ of the drum 15 and a few turns taken around the drum 14 by turning the same through the medium of the finger members 15ᶻ, it being understood that the pins 9ᵃ of the drum 9 are inserted in the apertures 100ᵃ of the envelop or sales strip 100. The crank 50 is then turned in the direction of the arrow in Fig. 1, which causes the following general action to take place. First, the strip 100 is fed one step forwardly in the direction of the arrow in Fig. 1, to bring a certain pocket in alinement with the chute 21, after which the movement of the strip 100 through the guide 3 ceases and the arm 25 is rocked to insert the needles 25ᵉ into the vendible article strip 200, after which, the carriage 23 is moved in the direction of the arrow in Fig. 1, a distance sufficient to project one article section into the envelop pocket. As soon as the article section has been projected into the envelop pocket the arm 25 is again rocked and the needles 25ᵉ withdrawn from the strip 200 a further movement of the crank 50 in the direction of the arrow in Fig. 1, serves to return the carriage 23 to its initial position, and at the same time the pawl 40ˣ engages the trip 34 to rock the movable knife 30 to cut the strip section that is in the envelop pocket from the strip 200, the action of the knives being instantaneous. A further movement of the crank 50 in the direction of the arrow in Fig. 1, causes the pawl 17ᵇ to engage one of the rack teeth of the disk 9ᵈ and rotate the drum 9 forwardly a distance equal to one envelop section when the foregoing action again takes place.

While a vendible article is being inserted into the pocket just in front of the chute 21, the pocket which had previously been filled will aline with the pusher 24, and as the carriage 23 moves in the direction of the arrow in Fig. 1, to insert a vendible article in the pocket in front of the chute 21, the pusher 24 will push the previously fed article "home" into the envelop pocket just ahead of that in front of the chute 21.

The foregoing action is repeated through the medium of the mechanism hereinbefore referred to.

*Detailed description of the envelop feeding mechanism.*—The envelop being threaded through the guide 3 and onto the drum 15, as before stated, the movement of the crank 50 in Fig. 4, will cause the rotation of the drive shaft 20 which carries the arm 19 that moves the sliding frame 18 back and forth, which back and forth movement of the frame 18 causes the arm 17 to be oscillated by reason of its connection therewith through the bearings 17$^t$ and 18$^a$ but the arm 17 is moved a distance from the position shown in Fig. 4, until the pawl 17$^b$ abuts the ratchet teeth of the ratchet disk 9$^d$ before any movement of the ratchet disk 19$^d$, and consequently the feed drum 9, takes place. As soon as the pawl 17$^b$ engages a tooth of the ratchet disk 9$^d$ the drum 9 will be operated and draw the strip 100 through the guide 3 a corresponding distance (equal to one envelop section). The limit of the movement of the drum 9 in its feeding movement is repeated when the frame 18 is at its farthest distance to the left in Fig. 4 and as the frame 18 moves from left to right in Fig. 4, the pawl 17$^b$ will be carried backward without effecting the operation of the drum 9 the time elapsing between the stopping of the movement of the drum 9 and the commencement of its second movement is sufficient to enable the vendible strip feeding and cutting mechanism to work in a manner presently to be more fully explained. Should the envelop 100 creep forwardly for any reason the set screw 7$^d$ may be regulated to change the tension of the member 7$^c$ and counteract such forward creeping. This is done by tightening the screw 7$^d$. Should there be a "lag" in the movement of the envelop 100, the screw 7$^d$ may be loosened to relieve the tension on the envelop strip, and if this is not sufficient and the "lag" is caused by slipping of the belt 10, the shaft 12 may be turned slightly in its bearing 1$^y$ to tighten the belt 10.

The operation of the strip feeding mechanism in detail is as follows: As the drive shaft 20 is rotated in the direction of the arrow in Fig. 1, the cam disk 26 is first brought with its cam member 26$^a$ under the anti-friction roller 25$^h$ to cause the needles 25$^e$ to be inserted into the strip 200 and they will be held in their inserted position as long as the cam portion 26$^a$ is under the roller 25$^h$. As soon as the needles have been inserted in the strip 200 the cam groove 26$^a$ will have moved the bell crank lever 28 to cause the carriage 23 to move forwardly toward the envelop strip in the direction of the arrow in Fig. 1 and convey a section of the vendible strip 200 into the pocket of the envelop in front of the chute 21, it being understood that the pocket is held open by the openers 4 and 5. As the strip 200 has been moved forward with its section in the pocket of the envelop 100 and the carriage 23 reaches the limit of its movement in Fig. 1, the cam member 26$^a$ will leave the roller 25$^h$ and the leaf spring 25$^b$ will rock the rocking member 25 to withdraw the needles from the strip 200 so when upon further movement of the disk 26 the bell crank lever 28 will return the carriage 23 to its initial position.

The rotation of the shaft 20, as before stated, causes the oscillation of the frame 18 back and forth in its bearings, the movement of such frame being so timed that as soon as the carriage 23 has returned to its initial position the pawl 40 will have engaged the trip 34 and moved the knife 31 to shear or cut off the inserted article section, after which the spring 37 will return the knife to its initial position. Should the knife stick, the trip 26$^t$ will engage the trip 36$^t$ and return the rod 36 to its initial position, and hence return the knife 31 to its initial position, after which all of the foregoing operations will in their turn be repeated.

In Fig. 18, we have illustrated a means for separating the stamp compartment in the continuous envelop strip which comprises an arm 24$^y$ fastened at 24$^z$ to the carriage 23 and formed into a pusher 24$^x$ at its other end similar to the opener 24.

Figs. 19 and 20 disclose a means whereby the descension of the needles in the arc of a circle is eliminated, supplemental brackets 25$^w$ having slideways 25$^x$ wherein slots 25$^y$ are formed which guide the needle bar 25$^d$ in a vertical plane. A slot 25$^z$ is formed in the arm 25 that sufficient room for movement be provided. By such means the needles will descend and ascend vertically and feed the stamps the exact distance forwardly, whereas if they be allowed to arise on the arc of a circle a stamp will be fed a fraction ahead of its intended position, owing to the outward sweep of the needles in leaving the puncture in the stamps.

It should be stated that as the filled strip is wound on the drum 15 its diameter increases with each revolution of the drum 15 as more of the strip is being wound thereon, and hence the drum 15 will be moved farther and farther away from the feeding drum 9 and this movement is allowed by the pivoted arm 13.

From the foregoing description taken in connection with the accompanying drawings, it is thought the complete construction, operation and many advantages of our invention will be readily understood by those skilled in the art to which the invention appertains.

What we claim is:

1. In a loading machine of the character stated, means for feeding a continuous paper strip longitudinally, means for feeding a continuous-envelop having pockets past said strip feeding means to receive said strip, and a cutting mechanism for severing sections from said strip when inserted into the envelop, substantially as shown and described.

2. In a loading machine, a step-by-step feeding mechanism for feeding continuous envelops having pockets, a step-by-step article feeding mechanism combined with an intermittently operated article cutting mechanism, together with a pusher for forcing the severed article fully into the envelop pockets.

3. In a loading machine, a step-by-step continuous-envelop feeding mechanism, a step-by-step article feeding mechanism for delivering articles into the envelop, the envelop having pockets to receive the article, a cutting mechanism for separating the article from its strip, and a pusher for forcing the severed article fully into one of the envelop pockets as the article feeding mechanism inserts another article into one of the envelop pockets.

4. In a loader, an envelop feeding mechanism, a vendible article feeding and inserting mechanism together with a cutting mechanism for severing the vendible article from its strip, and means for opening the envelop as it passes the delivery part of the article inserting mechanism.

5. In a loader, an envelop feeding mechanism, a vendible article feeding and inserting mechanism togteher with a cutting mechanism for severing the vendible article from its strip, means for opening the envelop as it passes the delivery part of the article inserting mechanism, and means for pushing the severed article "home" into the envelop.

6. In a loader for continuous envelops having a series of pockets, a step-by-step feeding mechanism comprising a drive shaft, a feed drum for engaging the envelop and feeding it, a reciprocating frame, crank connections between the drive shaft and the frame to reciprocate the frame, ratchet and pawl devices connecting the frame and the feed drum to operate the feed drum by the movement of the frame, and an envelop guide coöperating with said feed mechanism, combined with an article feeding mechanism for delivering the article into the envelop pockets as the envelop passes by said feeding mechanism.

7. In a loader for continuous envelops, a step-by-step feeding mechanism comprising a drive shaft, a feed drum for engaging the envelop and feeding it, a reciprocating frame, crank connections between the drive shaft and the frame to reciprocate the frame, ratchet and pawl devices connecting the frame and the feed drum to operate the feed drum by the movement of the frame, an envelop guide coöperating with said feed mechanism, combined with an article feeding mechanism for delivering the articles into the envelop, together with means for opening the envelop as it passes the article feeding mechanism.

8. In a loader, mechanism for feeding a continuous-envelop having article receiving pockets, an article delivering mechanism to deliver articles into the pockets of said envelop, combined with means for opening the envelop as it passes the article feeding mechanism to receive the article.

9. In a loader, mechanism for feeding continuous-envelops having pockets, an article delivering mechanism for successively delivering articles into the pockets of said envelops, substantially as shown and described.

10. In a loader, mechanism for feeding continuous-envelops having pockets, an article delivering mechanism for successively delivering articles into the pockets of said envelops, together with means for opening the envelop as it passes the article feeding mechanism to receive the article.

11. In a loader, mechanism for feeding continuous-envelops having pockets, an article delivering mechanism for successively delivering articles into the pockets of said envelops, together with means for opening the envelop as it passes the article feeding mechanism to receive the article, and means for again closing said envelop after it passes the article feeding mechanism.

12. In a loader for continuous envelops, an envelop feeding mechanism comprising an envelop guide, a feed drum and a winding up drum, means for operating said feed drum, means connecting said feeding drum with said winding up drum to work the same from the feeding drum, together with article delivering mechanism to deliver articles into the envelop.

13. In a loader for continuous envelops, an envelop feeding mechanism comprising an envelop guide, a feed drum and a winding up drum, means for operating said feed drum, means connecting said feeding drum with said winding up drum to work the same from the feeding drum, together with article delivering mechanism to deliver articles into the envelop, and an article severing mechanism to sever the delivered article from the undelivered portion.

14. In a loading machine, a mechanism for feeding continuous-envelops having a series of pockets, combined with an article feeding mechanism for feeding articles into the pockets of the envelop, said article feeding mechanism comprising a sliding carriage, an article guide chute, and means carried by the sliding carriage for gripping the article in the chute during the sliding movement of the carriage, and means for sliding said carriage to force the article into the envelop.

15. In a loader, an envelop feeding mechanism and an article feeding mechanism for feeding articles into the envelop, said article feeding mechanism comprising a rotatable cam disk, a sliding carriage, connections between the cam disk and the sliding carriage for reciprocating the sliding carriage, an article gripper carried by the sliding carriage for engaging the article to cause it to move with the carriage, and connections between the gripper and the cam disk for actuating the gripper to grip the article.

16. In a loader, an envelop feeding mechanism and an article feeding mechanism for feeding articles into the envelop, said article feeding mechanism comprising a rotatable cam disk, a sliding carriage, connections between the cam disk and the sliding carriage for reciprocating the sliding carriage, an article gripper carried by the sliding carriage for engaging the article to cause it to move with the carriage, connections between the gripper and the cam disk for actuating the gripper to grip the article, and means for severing a section of the article as it is delivered to the envelop.

17. In a loader, an envelop feeding mechanism, an article delivering mechanism combined with a mechanism for severing the article as it is delivered to the envelop, said severing means comprising a reciprocating frame, a movable cutter and a fixed cutter, and trip devices connecting the reciprocating frame with the movable cutter to work the same and means for reeling up the envelop after it has been loaded.

18. In a loader, an envelop feeding mechanism, an article delivering mechanism combined with a mechanism for severing the article as it is delivered to the envelop, said severing means comprising a reciprocating frame, a movable cutter and a fixed cutter, trip devices connecting the reciprocating frame with the movable cutter to work the same, and means independent of the reciprocating frame for returning the movable cutter to its initial position and means for reeling up the envelop after it has been loaded.

19. In a loader, an envelop feeding mechanism, an article delivering mechanism combined with a mechanism for severing the article as it is delivered to the envelop, said severing means comprising a reciprocating frame, a movable cutter and a fixed cutter, trip devices connecting the reciprocating frame with the movable cutter to cut the same, means independent of the reciprocating frame for returning the movable cutter to its initial position, and connections between the reciprocating frame and the movable cutter for positively returning the movable cutter to its initial position and means for reeling up the envelop after it has been loaded.

20. In a loader, an envelop feeding mechanism, an article delivering mechanism combined with a mechanism for severing the article as it is delivered to the envelop, said severing means comprising a reciprocating frame, a movable cutter and a fixed cutter, trip devices connecting the reciprocating frame with the movable cutter to cut the same, means independent of the reciprocating frame for returning the movable cutter to its initial position, connections between the reciprocating frame and the movable cutter for positively returning the movable cutter to its initial position, said last named means comprising a rod connected with the movable cutter, and supplemental trip devices connecting said rod with said reciprocating frame for returning the cutter to its initial position and means for reeling up the envelop after it has been loaded.

21. In a loader, an envelop feeding mechanism and an article containing chute, combined with means for gripping the article, and moving a section thereof into the envelop, and means for severing the section from the remainder of the article.

22. In a loading machine, means for loading continuous envelops having pockets, said means including means for opening the envelop pockets before they reach a predetermined place and another means for closing such pockets after the envelop passes said predetermined place, substantially as shown and described.

23. Means for moving a continuous-envelop having a series of pockets step-by-step past a loading place, combined with means for holding the envelop open as it passes the loading place, and means for closing the envelop again after it has been loaded.

24. Means for feeding a continuous envelop step-by-step past a loading place, means for opening said envelop as it passes the loading place, and means for closing said envelop after it passes the loading place, together with means for reeling the loaded envelop into a reel form.

25. Means for feeding a continuous envelop step-by-step past a loading place, means for opening said envelop as it passes the loading place, means for closing said envelop after it passes the loading place, together with means for reeling the loaded envelop into a reel form, and tension devices coöperating with the feeding means and the envelop to prevent the envelop lagging or creeping.

26. Envelop feeding mechanism comprising a feed drum having provisions for engaging a continuous envelop having pockets, a drive shaft, means connecting the drive shaft with the feed drum to impart a step-by-step movement to the feed drum in one direction, an envelop guide through which said envelop is passed, said guide having cut-away portions, means held in said cut-away portions for opening the envelop pockets during an interval of its passage, and means for again closing the envelop after it leaves the cut-away portion.

27. A feeding mechanism for continuous envelops having pockets comprising a feed drum having provisions for engaging the envelop, a drive shaft, means connecting the drive shaft with the feed drum to impart a step-by-step movement to the feed drum in one direction, an envelop guide through which said envelop is passed, said guide having cut-away portion, means held in said cut-away portions for opening the envelop pockets during an interval of its passage, means for again closing the envelop after they leave the cut-away portion, having another cut-away portion and a relatively fixed resilient presser held to project in said cut-away portion and engage the envelop adjacent to said first mentioned cut-away portion.

28. A feeding mechanism for continuous envelops having pockets comprising a feed drum having provisions for engaging the envelop, a drive shaft, means connecting the drive shaft with the feed drum to impart a step-by-step movement to the feed drum in one direction, an envelop guide through which said envelop is passed, said guide having cut-away portions, means held in said cut-away portions for opening the envelop pockets during an interval of its passage, and means for again closing the envelop after they leave the cut-away portions, and a tension device to engage the envelop as it passes through the guide to prevent forward creeping of the envelop.

29. Means for feeding a continuous envelop comprising a feed drum having provisions to engage said envelop, means for reeling up the envelop as it leaves the feed drum, an envelop guide through which the envelop passes, before it reaches the feed drum, said envelop guide being of flattened tubular form and having a cut-away portion to expose the envelop in its passage through the guide, means held in said cut-away portion for opening the envelop as it passes the exposed portion of the guide, said means comprising a plate under which a section of the envelop passes and a finger above the plate, over which the envelop passes to hold the same open at the exposed portion of the guide.

30. Means for feeding a continuous-envelop comprising a feed drum having provisions to engage said envelop, means for reeling up the envelop as it leaves the feed drum, an envelop guide through which the envelop passes before it reaches the feed drum, said envelop guide being of flattened tubular form and having a cut-away portion to expose the envelop in its passage through the guide, means held in said cut-away portion for opening the envelop as it passes the exposed portion of the guide, said means comprising a plate under which a section of the envelop passes to hold the same open at the exposed portion of the guide, said guide adapted to close said envelop again after it passes the opening means.

JAMES REID WILLIAMS.
WILLIAM CYRUS BRIGGS.

Witnesses:
M. H. P. CLARK,
J. WALTER CLAYTON,
FRANK S. FOY.